US011876332B2

(12) United States Patent
Zahle

(10) Patent No.: US 11,876,332 B2
(45) Date of Patent: Jan. 16, 2024

(54) CABLE PROCESSING DEVICE FOR PROCESSING A CABLE

(71) Applicant: SCHLEUNIGER AG, Thun (CH)

(72) Inventor: Andreas Zahle, Radevormwald (DE)

(73) Assignee: Schleuniger AG, Thun (CH)

( * ) Notice: Subject to any disclaimer, the term of this patent is extended or adjusted under 35 U.S.C. 154(b) by 55 days.

(21) Appl. No.: 17/355,837

(22) Filed: Jun. 23, 2021

(65) Prior Publication Data

US 2021/0408750 A1 Dec. 30, 2021

(30) Foreign Application Priority Data

Jun. 24, 2020 (EP) .................................... 20181889

(51) Int. Cl.
*H01R 43/052* (2006.01)

(52) U.S. Cl.
CPC .................................. *H01R 43/052* (2013.01)

(58) Field of Classification Search
CPC ............................ H01R 43/052; H01R 43/048
See application file for complete search history.

(56) References Cited

U.S. PATENT DOCUMENTS

| | | | | |
|---|---|---|---|---|
| 9,793,671 | B2 * | 10/2017 | Schuetz | H01R 43/28 |
| 2017/0023510 | A1 * | 1/2017 | Viviroli | G01R 19/155 |
| 2021/0118594 | A1 | 4/2021 | Keil et al. | |
| 2021/0408750 | A1 * | 12/2021 | Zahle | H01R 43/052 |

FOREIGN PATENT DOCUMENTS

| | | | |
|---|---|---|---|
| DE | 41 07 250 | A1 | 11/1991 |
| DE | 10 2017 102 941 | A1 | 8/2018 |
| EP | 2 590 275 | A1 | 5/2013 |
| WO | 98/13907 | A1 | 4/1998 |

OTHER PUBLICATIONS

European Search Report Corresponding to 20181889.5 dated Nov. 6, 2020.

* cited by examiner

*Primary Examiner* — Minh N Trinh
(74) *Attorney, Agent, or Firm* — Finch & Maloney PLLC

(57) ABSTRACT

A cable processing device (20) for processing a cable (15), which comprises a first positioning mechanism (30) comprising a first positioning drive (35) for vertically positioning a tool mounting (22) relative to the cable conveying direction (F) of a cable conveying mechanism (100), and a control mechanism (50), which is connected to the first positioning drive (35) for exchanging first control data. A second positioning mechanism (40), comprising a second positioning drive (45) for at least vertically positioning a first cable stop (25) relative to the cable conveying direction (F) of the cable conveying mechanism (100), is also present. The second positioning drive (45) is connected to the control mechanism (50) for exchanging second control data. The invention also relates to computer-implemented methods, a computer program product, as well as a computer readable storage medium.

11 Claims, 7 Drawing Sheets

CABLE PROCESSING DEVICE FOR PROCESSING A CABLE

This application claims priority to European patent application serial no. 20181889.5 filed Jun. 24, 2020.

FIELD OF THE INVENTION

The invention relates to a cable processing device for processing a cable, computer-implemented methods, a computer program as well as a computer readable storage medium according to the independent claim(s).

BACKGROUND OF THE INVENTION

Cable processing devices typically comprise tools, by means of which a cable or a cable end, respectively, are processed. The tool can thereby be a stripping knife for stripping a cable insulation from the cable conductor, or crimping tools, which establish a crimped connection between a stripped cable end and a plug element. During the crimping, one of the tools is usually moved in such a way during the processing that a joining process is carried out, during which two components are connected to one another by means of plastic deformation. A suitable combination of tool and pressing pressure has to be applied for each tool/cable pairing. The properties of the end product are thus improved.

EP 2 590 275 B1 comprises a cable processing device for processing a cable, which comprises a manually operated positioning means for vertically positioning a cable stop relative to a cable conveying direction of a cable conveying means. A cable processing device of a similar generic type is disclosed in DE 10 2017 102 941 A1.

It is a disadvantage of these solutions that an incorrect operation of the cable processing devices by an operator cannot be ruled out, so that a significant waste of cable end products or cable intermediate products, respectively, is produced.

SUMMARY OF THE INVENTION

It is the object of the present invention to at least partially eliminate the disadvantages of the prior art and to provide a cable processing device, which has an individual and automatic vertical adjustment for improving the quality of the cable end product or cable intermediate product. Computer-implemented methods for configuring a cable processing device as well as for automatically determining and creating control commands and/or control data are to furthermore be provided, a computer program product as well as a computer readable storage medium are to be created, by means of which the processing speed in a cable processing device is increased and the quality of the cable end products or cable intermediate products is improved significantly at the same time.

The object is solved by means of the features of the independent claims. Advantageous further developments are specified in the figures and in the dependent patent claims.

A cable processing device according to the invention for processing a cable, in particular a crimping station for assembling a cable connection at a cable end of the cable, comprises a first positioning means comprising a first positioning drive for vertically positioning a tool mounting relative to a cable conveying direction of a cable conveying means, and a control means, which is connected to the first positioning drive for exchanging first control data. A second positioning means comprising a second positioning drive for at least vertically positioning a first cable stop relative to the cable conveying direction of the cable conveying means is furthermore present, wherein the second positioning drive is connected to the control means for exchanging second control data.

The vertically positionable means of the present cable processing device can thus be set individually or independently of one another, respectively, and in a reproducible automated manner, so that the throughput of cable end products or cable intermediate products, respectively, is increased significantly, and the quality of the cable end product or cable intermediate product, respectively, is improved significantly at the same time. With the help of their positioning drives, the tool mounting and/or the first cable stop can be moved independently of one another and in a reproducible manner from any location or position, respectively, into the operating location thereof. The processing of the cable end product or cable intermediate product, respectively, can thus be adapted individually as a function of the structural cable setup thereof, without assistance from an operator.

The first tool mounting can be, for example, the anvil of a crimping station. For example, several plug elements are arranged on the first tool mounting or on the anvil, respectively, wherein at least one plug element can be positively connected in a highly accurate manner to a cable conductor of a cable, in order to produce a cable end product or cable intermediate product, respectively. The anvil can have a first crimping tool, which is held in a stationary or fixed manner, respectively, at the tool mounting during the processing process or cable processing step, respectively. During the processing process, a second crimping tool is guided towards the first crimping tool or is brought into operative connection therewith, respectively, in such a way during the crimping that a crimped connection can be established between a plug element and the cable conductor of the cable. The cable conductor has to thereby be connected to the plug element so as to overlap in such an exact manner that a contact-secure connection is created. It can in particular be prevented by means of this exact positioning of the first cable stop that the cable conductor shifts axially against the conveying direction during the crimping and distances itself from the desired position in the plug element. Unwanted tensile forces on the cable when establishing the crimped connection are likewise prevented therewith. These unwanted tensile forces can otherwise lead to a deformation of the cable conductor and to an associated reduction of the diameter of the cable conductor in the region of the crimped connection.

The first and the second crimping tool are adapted to the cable to be processed or cable setup, respectively, as well as to the plug element, which can be connected therewith, during the production process, and are set up individually, depending on the manufacturer of the crimping tools. The crimping tools have different dimensions. The vertical positioning of the tool mounting with the help of the first positioning drive as well as the vertical positioning of the first cable stop improves the setting of the cable processing device, so that the quality of the cable end product or cable intermediate product, respectively, is increased or secured, respectively, and the productivity is increased significantly by means of the cable processing device, without assistance from an operator (test trials surprisingly resulted in approx. 500 cable end products additionally with significantly high quality, per hour). The waste of defective cable end products as well as cable intermediate products is reduced significantly at the same time. A cable end product or cable intermediate product, respectively, comprising a crimped connection of correspondingly high quality has a contact-secure connection, i.e. the crimped connection is mechanically stable, so that tensile forces at the plug element or at the cable do not lead to a deterioration of the connection. A contact-secure connection further has a large overlap region between cable conductor and connecting section at the plug element, so that the crimped connection is designed of high quality and, e.g., electrical voltage spikes can be prevented.

A stripping means comprising a stripping knife, which is arranged on the vertically positionable tool mounting, is mentioned as further example of a cable processing device, which is listed in a non-exhaustive manner.

For example, the cable guided to the tool mounting is arranged on a pivotable cable conveying means and can be pivoted horizontally in a cable pivoting plane from a first processing station to the cable processing device described here. The pre-positioning—thus the positioning prior to the start of the cable processing step—of the first tool mounting below the cable conveying direction or below the cable pivoting plane, respectively, prevents a collision of the cable end with the tool mounting or with the tool, at the tool mounting, respectively, during the pivoting with the cable conveying means. An unwanted deformation of the cable end is thus prevented. The operating location of the tool mounting is thereby that position of the tool mounting, at which the cable conductor of the cable can be pivoted horizontally in a cable pivoting plane in a collision-free manner over/above the tool mounting or over the tool at the tool mounting, respectively, and in particular no repositioning of the tool mounting is required prior to processing the cable.

The first positioning drive is preferably formed as actuating drive and comprises, e.g., a spindle, a sliding wedge, or similar suitable elements as actuating unit for positioning the tool mounting. The actuating drive is connected to the control means for exchanging control commands. The tool mounting can thus be positioned vertically in an easily reproducible manner. The actuating drive thereby receives at least one control command for vertically positioning the tool mounting as first control data from the control means. In the alternative, the first positioning drive is a servomotor, so that the first tool mounting can be set vertically in both directions in a highly accurate manner. In the alternative, the first positioning drive can be formed as pneumatic drive, so that the positioning of the tool mounting can be carried out quickly by means of a cost-efficient drive.

During the conveying, the cable to be processed is typically moved along the conveying direction of the cable conveying means. The cable to be processed can thereby be capable of being guided to the tool mounting in a guide unit, such as, for example, a small exchangeable guide tube, which is designed exactly for the cable diameter. The first cable stop is formed to fix or to support, respectively, the pivotable conveying arm and/or the guide unit in such a way that a reproducible cable processing step can be performed, without the cable being deformed in an unwanted manner or bending in an unwanted manner, respectively. The first cable stop thereby acts as a counter bearing. The cable stop described here can be positioned vertically and independently of the tool mounting in a motor-driven manner with the help of the second positioning means. The second positioning drive, in particular for at least vertically positioning the first cable stop, is thereby connected to the control means for exchanging control commands. The pre-positioning of the first cable stop below the cable conveying direction or below the cable pivoting plane, respectively, prevents a collision of the cable end or of the guide unit, respectively, with the cable stop during the pivoting. An unwanted deformation of the cable end can thus be prevented. The operating location of the cable stop is thereby that position, at which the cable conveying means can be pivoted in a collision-free manner over the cable stop, and in particular no repositioning of the cable stop takes place prior to the processing by means of the tool. An unwanted bending is prevented, because this would lead, for example, to an unwanted movement of the cable against the cable conveying direction. This unwanted movement causes a shortened overlap region of the cable conductor with the connecting section at the plug element, so that the quality of the crimped connection at the cable end product or cable intermediate product, respectively, can be reduced significantly, and the cable has to optionally be counted as waste.

The second positioning drive is preferably formed as actuating drive and comprises a spindle as actuating unit for positioning the first cable stop. The actuating drive is connected to the control means for exchanging control commands. The first cable stop can thus be positioned in a simple, reproducible, vertical manner. The actuating drive thereby receives at least one control command for vertically positioning the cable stop as second control data. In the alternative, the second positioning means is a servomotor, so that the first cable stop can be set vertically in both directions in a highly accurate manner. In the alternative, the second positioning drive can be formed as pneumatic drive, so that the positioning of the first cable stop can be carried out quickly by means of a cost-efficient drive.

A first position sensor system for detecting at least the vertical position of the tool mounting is preferably present, wherein the first position sensor system is arranged on the first positioning drive. The first position sensor system can comprise, for example, a rotation sensor or Hall sensor or another sensor of this type for detecting the vertical position of the tool mounting, which detects the vertical position of the tool mounting at the cable processing device in a simple manner, and transmits it to the control means as sensor data. A position or location, respectively, of the tool mounting, which is current during operation, can thus be transmitted directly to the control means, in order to review the position or location, respectively, of the tool mounting and/or in order to initiate an adjustment of the tool mounting.

In the alternative or in addition, the first position sensor system comprises a first position sensor, in particular a mechanical position sensor. The first position sensor can be arranged spaced apart from and adjacent to the first positioning means, and can be, for example, an optical sensor. For example, a light barrier and a reflector can be used as optical sensor, which optically determines the position of the tool mounting relative to the cable conveying means in a simple manner. The first position sensor is connected to the control means for transferring sensor data.

A second position sensor system for detecting at least the vertical position of the first cable stop is preferably present, wherein the second position sensor system is arranged on the second positioning drive. The second position sensor system can be, for example, a rotation sensor or Hall sensor or another sensor of this type for detecting the vertical position of the first cable stop, which easily detects the vertical position or location, respectively, of the cable stop at the cable processing device, and transmits it to the control means as sensor data. A position or location, respectively, of the cable stop, which is current during operation, can thus be transmitted directly to the control means, in order to review the position or location, respectively, of the cable stop and/or in order to initiate an adjustment of the tool mounting.

In the alternative or in addition, the second position sensor system comprises a second position sensor, in particular a mechanical position sensor. The second position sensor can be arranged spaced apart from and adjacent to the second positioning means, and can be, for example, an optical sensor. For example, a light barrier can be used as optical sensor, which optically determines the position of the first cable stop relative to the cable conveying means in a simple manner. The second position sensor is connected to the control means for transferring sensor data.

The control means is advantageously designed to activate at least one tool of the cable processing device to perform a cable processing step, when reaching the operating location of the tool mounting. The processing process at the cable is thus started independently, without assistance from the operator. A bending of the cable when pivoting the cable into the cable processing device and prior to the processing process can be prevented, and the quality of the cable end product or of the cable intermediate product, respectively, is thus improved.

In the alternative or in addition, the control means is designed to activate at least one tool of the cable processing device to perform a cable processing step, when reaching the operating location of the cable stop. The processing process at the cable is thus started independently, without assistance from the operator, wherein a bending of the cable when processing the cable into the cable processing device and prior to the processing process can be prevented, and the quality of the cable end product or of the cable intermediate product, respectively, is thus improved.

The control means preferably has a computing unit, so that the sensor data of at least one of the two position sensor systems can be processed easily.

The control means is preferably connected to the first position sensor system for exchanging sensor data. Not only a transfer of data is possible thereby, but a setting at the first position sensor system is also possible easily with the help of the control means.

In the alternative or in addition, the control means is connected to the second position sensor system for exchanging sensor data. Not only a transfer of data is possible thereby, but a setting at the second position sensor system is also possible easily with the help of the control means.

The computing unit is preferably formed to create at least one control command for positioning the first tool mounting from the sensor data of the first position sensor system. The positioning of the tool mounting is thus possible in a fully automatic manner and without assistance from a user, so that the quality of the cable end product or cable intermediate product, respectively, is further improved, because an operator error is ruled out. When reaching the operating location of the tool mounting, thus when it is determined by means of the first position sensor system that the tool mounting is brought into the operating location, the pivoting of the conveying arm of the cable conveying means can be deactivated, and a cable processing step can be started. The operational safety is thus further improved.

In the alternative or in addition, the computing unit is formed to create at least one further control command for positioning the first cable stop from the sensor data of the second position sensor system. The positioning of the first cable stop is thus possible in a fully automatic manner and without assistance from a user, so that the quality of the cable end product or cable intermediate product, respectively, is further improved, because an operator error is ruled out. When reaching the operating location of the first cable stop, thus when it is determined by means of the second position sensor system that the first cable stop is brought into the operating location, the pivoting of the conveying arm of the cable conveying means can be deactivated, and a cable processing step can be started.

At least one storage unit is preferably present, which is connected to the control means, wherein the control means is formed to recall at least one control command from the at least one storage unit, in order to drive at least one of the two positioning drives. The control command can thereby comprise position data for the operating location of the tool mounting and/or of the first cable stop. Depending on the cable type to be processed or cable setup, respectively, and depending on the tool, the position data is adapted individually in the cable processing device. For example, the position data relating to the operating location of the tool mounting and/or of the first cable stop of a coaxial cable thereby differ from the position data relating to the operating location of the tool mounting and/or of the first cable stop of a multicore ribbon cable. The tools for processing these two mentioned cable types at the cable processing device are typically set up differently, so that the position data relating to the operating location of the tool mounting and/or of the first cable stop are likewise adapted to the tools arranged in the cable processing device.

In the alternative or in addition, at least one database is present, which is connected to the control means, wherein the control means is formed to recall at least one control command from the at least one database, in order to drive at least one of the two positioning drives. The control command can thereby comprise position data for the operating location of the tool mounting and/or of the first cable stop, as described above. The database can advantageously be formed as cloud, so that different cable processing devices can easily recall the control commands or control data sets.

The operating location of the tool mounting and/or of the first cable stop can be defined as a function of the structural setup of the cable end product or cable intermediate product, respectively, to be processed, such as the cable diameters, the setup or the material, respectively, of the cable conductor, the cable type, the cable conductor length, the suitable small guide tube (interchangeable part matching the cable diameter), the plug element type, the plug element setup, the tool at the cable processing device, etc., listed in a non-exhaustive manner. This information can be stored in the at least one control command in the storage unit and/or the database. These control commands can be recalled automatically from the control means, so that a fully automatic setting, for example after the retrofitting from the processing of a first cable type to a second cable type, is possible at the cable processing device without assistance from an operator.

A base structure is preferably present, and the tool mounting is arranged in a stationary manner on the base structure, wherein the base structure can be positioned at least vertically relative to the cable conveying direction of the cable conveying means with the help of the first positioning means. The base structure can be movably arranged on a basic support structure. The cable processing device can thus be set up in a small and compact manner, because the distance between the tools in the cable processing device is small.

A further cable stop and a further positioning means are preferably present, wherein the further positioning means in particular has a further positioning drive for at least vertically positioning the further cable stop. The further cable stop is arranged opposite to the first cable stop and pushes on the guide unit or the small guide tube, respectively, in order to fix the cable, when the processing process is carried out. During the crimping, the cable conductor of the cable is pushed, for example, vertically from the top into the connecting section of the plug element by means of the movement of the further stop. To prevent an overshooting of the guide unit, which carries mass, the first cable stop serves as counter bearing, so that a bending of the cable or of the cable conductor, respectively, at the cable is prevented. The cable to be processed is additionally fixed, so that the quality of the cable end product or of the cable intermediate product, respectively, is improved. The further positioning means can have a guide rail and a spring unit, so that the further cable stop is spring-mounted, so as not to damage the guide unit or the cable, respectively. The further positioning drive can be formed in a motor-driven manner, and can be connected to the control means for exchanging position data of the operating location of the further cable stop. An operating location of the further cable stop can thus also be set easily and can be set in a fully automatic manner.

A detection means for detecting cable-specific data is preferably present. The detection means detects, for example, a contact-free scanner unit, such as, for example, a camera, or a barcode reader, or a QR scanner, or the like, so that the cable to be processed can be recognized easily, and cable-specific data are recognized without assistance from a user. For this purpose, the cable has, for example, a corresponding code or is recognized by means of image recognition. The cable-specific data comprises in particular the structural setup of the cable to be processed, such as the cable diameter, the setup or the material, respectively, of the cable conductor, the number of the individual cable conductors in the cable, the cable type, the cable conductor length, the setup and/or the material of the cable insulation or cable sheathing, respectively, etc., listed in a non-exhaustive manner. The cable-specific data can also be determined via the geometry of the cable. For example, images can serve for this purpose, which are detected by the camera which and are evaluated in the computing unit by means of image processing algorithms. In the alternative, other sensors can also be used, which can identify the cable. Additional data, such as, for example, the pressing pressure for a crimping tool, can be brought from the storage unit or the database into the computing unit by means of the detected cable-specific data.

In the alternative or in addition, a detection means for detecting tool-specific data is present. The detection means detects the tool type at the cable processing device with the help of the contact-free scanner unit, as described above, wherein the tool-specific data comprises the setup, the dimension, the material of at least one tool at the cable processing device, not listed in an exhaustive manner. For this purpose, the tool has, for example, a corresponding code or is recognized by means of image recognition. The tool-specific data can also be determined via the geometry of the tool. For example, images can serve for this purpose, which are detected by the camera and which are evaluated in the computing unit by means of image processing algorithms. In the alternative, other sensors can also be used, which can identify the tool. Additional data, such as, for example, the pressing pressure for a crimping tool, can be brought from the storage unit or the database into the computing unit by means of the detected tool-specific data.

The data detection means is preferably connected to the control means for exchanging the cable-specific data and/or the tool-specific data. The control means is formed to convert the cable-specific data and/or tool-specific data from the detection means into at least one control command for the operating location of the tool mounting, in order to position the tool mounting according to the cable to be processed. In the alternative or in addition, the control means is formed to convert the cable-specific data and/or tool-specific data from the detection means into at least one control command for the operating location of the first cable stop, in order to position the first cable stop according to the cable to be processed. The conversion takes place, for example, in the computing unit of the control means.

In the alternative or in addition, the control means is formed to compare the cable-specific data and/or tool-specific data detected by means of the detection means to corresponding control commands in the storage unit and/or in the database, in order to position the tool mounting and/or the first cable stop or to move the operating location thereof, respectively, according to the cable to be processed. The level of automation is thus further increased, so that a fully automatic cable processing device for assembling a cable end product or cable intermediate product, respectively, is provided.

The control means is preferably formed to review the compatibility of the tool arranged on the cable processing device with the cable to be processed when detecting new cable-specific data and/or tool-specific data by means of the detection means, so that an incorrect processing of the cable can be prevented. The processing safety in the cable processing device is thus increased significantly, and the likelihood of the production of waste is further reduced.

According to a computer-implemented method according to the invention for configuring a cable processing device by means of a control means, in particular a cable processing device as described above, which automatically carries out a method for positioning a tool mounting and a first cable stop, the tool mounting and the first cable stop are positioned vertically with the help of a control means, wherein the positioning takes place as a function of a cable conveying direction of a cable conveying means.

During the automatic configuration or setting, respectively, of the operating location of the tool mounting and of the operating location of the first cable stop, the control means transmits stored control commands to the positioning means of the tool mounting and to the positioning means of the first cable stop. The vertical positioning of the tool mounting as well as the vertical positioning of the first cable stop improves the setting of the cable processing device, so that the quality of the cable end product or cable intermediate product, respectively, is increased, and the productivity is increased significantly by means of the cable processing device, without assistance from an operator (test trials surprisingly resulted in approx. 500 cable end products additionally with significantly high quality, per hour). The waste of defective cable end products as well as cable intermediate products can be reduced significantly at the same time.

The tool mounting and the first cable stop are in particular positioned vertically independently of one another. For example only the position of the operating location of the tool mounting can be set therewith, for example during a tool change at the cable processing device and a cable, which is to be processed in an unchanged manner, so that for example the production of the cable end products as well as cable intermediate products is restarted easily and more quickly. The cable processing process time or the setup time of the cable processing device, respectively, is thus shortened significantly.

The positioning of the tool mounting and of the first cable stop, in particular in the operating location thereof, preferably takes place prior to a cable processing step. The control means recognizes the current position of the tool mounting and of the first cable stop, and triggers the movement at least of the tool mounting and/or of the first cable stop in the operating location thereof, in that at least one control command is transmitted to the respective positioning drive.

Sensor data is preferably detected by a first position sensor system, and the tool mounting is positioned on the basis of the sensor data. The sensor data is transmitted to the control means, so that the control means can carry out a correct and reproducible positioning of the tool mounting with the help of the sensor data.

In the alternative or in addition, sensor data is detected by the first position sensor system, and the first cable stop is positioned on the basis of the sensor data. The sensor data is transmitted to the control means, so that the control means can carry out a correct and reproducible positioning of the first cable stop with the help of the sensor data.

In the alternative or in addition, sensor data is detected by a second position sensor system, and the first cable stop is positioned on the basis of the sensor data. The sensor data is transmitted to the control means, so that the control means can carry out a correct and reproducible positioning of the first cable stop with the help of the sensor data. The position of the first cable stop can thus be detected and controlled or set, respectively, independently of the position of the tool mounting.

The control means preferably recalls control data for positioning the tool mounting from a storage unit. The control data can thereby comprise control commands for positioning the tool mounting in the operating location thereof. The control means comprises a computing unit as well as a storage means, wherein the computing unit is formed to recall the control data from the storage unit and to assign it to the tool mounting.

In the alternative or in addition, the control means recalls control data for positioning the first cable stop from a storage unit. The control data can thereby comprise control commands for positioning the first cable stop in the operating location thereof. The computing unit is formed to recall the control data from the storage unit and to assign it to the first cable stop.

In the alternative or in addition, the control means recalls control data for positioning the tool mounting from a database. For example, the database can thereby be filled beforehand with control data, for example by an operator, according to cable type to be processed and/or tool type. In the alternative or in addition, the control means recalls control data for positioning the first cable stop from a database.

The positioning of the tool mounting preferably takes place on the basis of cable-specific data. The operating location of the tool mounting can thus be adjusted without errors to the cable to be processed.

In the alternative or in addition, the positioning of the first cable stop takes place on the basis of cable-specific data. The operating location of the first cable stop can thus be adjusted without errors to the cable to be processed.

In the alternative or in addition, the positioning of the tool mounting takes place on the basis of tool-specific data. The operating location of the tool mounting can thus be adjusted in an improved manner without errors to the cable to be processed or can be adapted to the tool type, respectively.

In the alternative or in addition, the positioning of the first cable stop takes place on the basis of tool-specific data. The operating location of the first cable stop can thus be adjusted in an improved manner without errors to the cable to be processed or can be adapted to the tool type, respectively.

The cable-specific data and/or tool-specific data is preferably detected by a detection means, as described here, and is transmitted to the control means. For example, a tool change at the cable processing device or a cable type change can thus be detected and recognized automatically, so that a quick reproducible positioning of the tool mounting and/or of the first cable stop can take place.

The control means advantageously creates at least one control command on the basis of the detected cable-specific data and/or tool-specific data, and positions the tool mounting and/or the first cable stop in the operating location thereof.

Further advantageous method steps are disclosed in the cable processing devices, which are described here.

According to a computer-implemented method according to the invention for automatically determining and creating control commands and/or control data for controlling a cable processing device, by means of a control means, in particular the cable processing devices described here, which carry out a method for positioning a tool mounting and a first cable stop, at least one control data set and/or a control command is created and stored.

By means of automatically determining and creating control commands and/or control data for controlling a cable processing device in the control means, in particular for controlling the tool mounting and the first cable stop, the vertical positioning of the tool mounting as well as the vertical positioning of the first cable stop becomes automatically retrievable, so that the quality of the cable end product or cable intermediate product, respectively, is increased, and the productivity is increased significantly by means of the cable processing device, without assistance from an operator (test trials surprisingly resulted in approx. 500 cable end products additionally with significantly high quality, per hour). The waste of defective cable end products as well as cable intermediate products can be reduced significantly at the same time.

In particular, several control data sets and/or control commands are created and stored, which can advantageously be stored in the storage unit of the control means and/or database. For example, the database can be accessed easily and independently by several cable processing devices.

Further advantageous method steps are disclosed in the cable processing devices described here.

A computer program product according to the invention comprises control commands and/or control data, which, when running the program by means of a computing unit, prompt the latter to carry out the method/the steps of the method for configuring a cable processing device or the method for automatically determining and creating control commands and/or control data. Different cable processing devices, as described here, can be controlled in a reproducible manner and can be controlled independently of one another with the help of the computer program product, wherein for example the control commands and/or control data can be created individually by all of the cable processing devices, which are integrated in the network, so that an "Internet of Things" application can be realized.

A computer readable storage medium comprises control commands and/or control data, which, when run by means of a computing unit, prompt a control means to carry out the method or the steps, respectively, of the above-mentioned method for configuring a cable processing device. The method for configuring a cable processing device, as described here, can thus be carried out at cable processing devices, which comprise a control means and a means for reading the control commands and/or control data at the storage medium. A cable processing device, which is already present at the user, can thus be retrofitted, so that the processing of the cable end product and/or of the cable intermediate product, can be carried out without assistance from the user.

BRIEF DESCRIPTION OF THE DRAWINGS

Further advantages, features, and details of the invention follow from the following description, in which exemplary embodiments of the invention are described with reference to the drawings.

The list of reference numerals as well as the technical content of the patent claims and figures is part of the disclosure. The figures are described coherently and comprehensively. Identical reference numerals represent identical components, reference numerals with different indices specify functionally identical or similar components, wherein

DETAILED DESCRIPTION OF THE PREFERRED EMBODIMENTS

Figure 1:
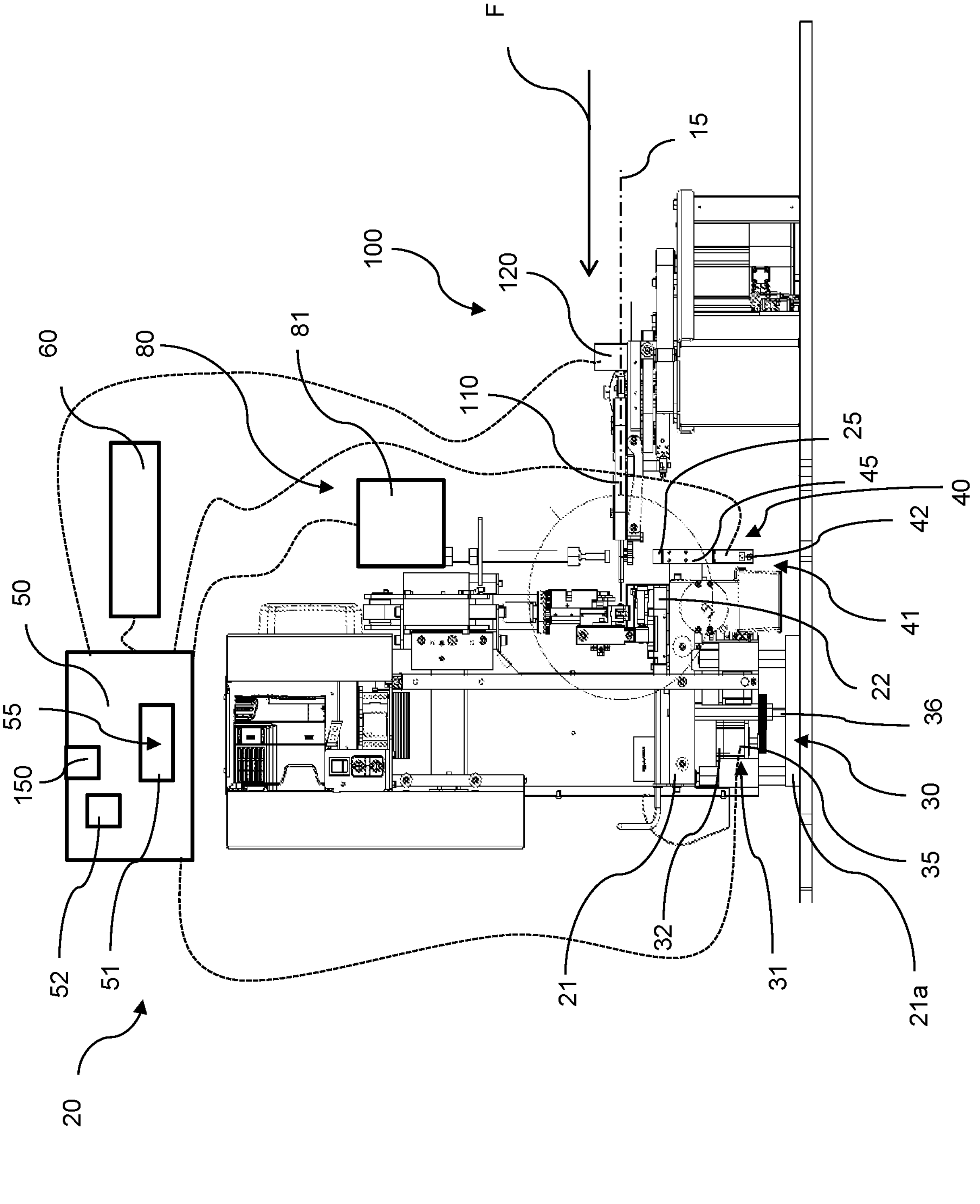
FIG. 1 shows a first embodiment of a cable processing device according to the invention in a sectional view comprising a cable conveying means in a side view.

FIG. 1 to FIG. 8 show a crimping station in an exemplary manner as cable processing device 20 for processing a cable 15 or for assembling a cable connection at a cable end of the cable 15, respectively. The cable processing device 20 comprises a basic support structure 21, on which a base structure 21*a* is arranged, as well as a first positioning means 30 comprising a first positioning drive 35 for vertically positioning a tool mounting 22 relative to a cable conveying direction F of a cable conveying means 100. A second positioning means 40 comprising a second positioning drive 45 for vertically positioning a first cable stop 25 relative to the cable conveying direction F of the cable conveying means 100 is furthermore present. The cable conveying means 100 has a conveying arm 110, which can be pivoted in a cable pivoting plane, so that the cable 15 can be pivoted horizontally in the cable pivoting plane from a first processing station to the cable processing device 20 described here. The cable conveying means 100 has a conveying drive 120 comprising conveying belts 121 for conveying the cable 15 in the cable conveying direction F as well as against the cable conveying direction F. The conveying belts 121 can be moved relative to one another and a closing pressure can be applied thereto, in order to clamp and to convey the cable 15. The cable pivoting plane is aligned essentially parallel to the cable conveying direction F.

The first positioning drive 35 is a actuating drive, which is electrically connected to a control means 50. The first positioning drive 35 comprises a spindle as actuating unit 36 for positioning the tool mounting 22 in the operating location thereof and away therefrom. The tool mounting is movably arranged on the spindle. The spindle is connected to the basic support structure 21 and the base structure 21*a*. The driving of the spindle effects a vertical positioning of the tool mounting 22. For this purpose, the actuating drive receives at least one control command as first control data from the control means 50.

The first positioning means 30 comprises a first position sensor system 31 for detecting at least the vertical position of the tool mounting 22, wherein the first position sensor system 31 is arranged on the first positioning drive 35. The first position sensor system is a rotation sensor 32, which easily detects the vertical position of the tool mounting 22 at the cable processing device 20.

Figure 2:
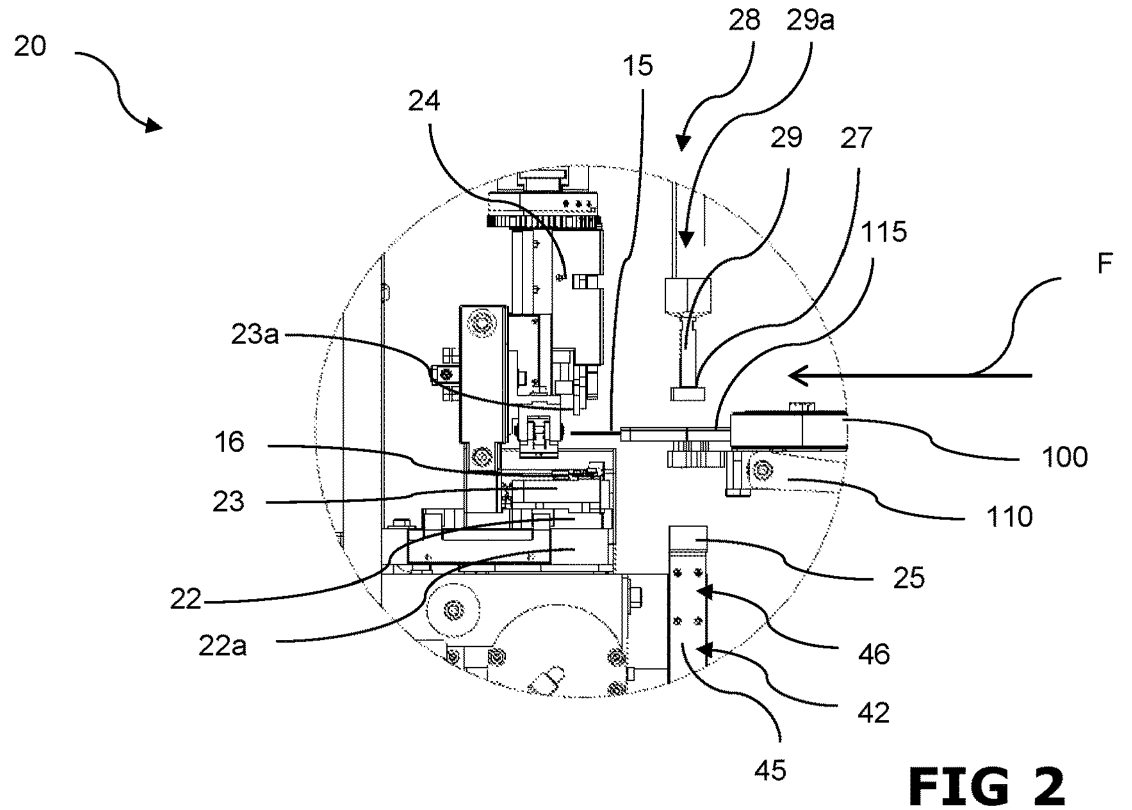
FIG. 2 shows the cable processing device according to FIG. 1 in a first detailed side view.
Figure 3:
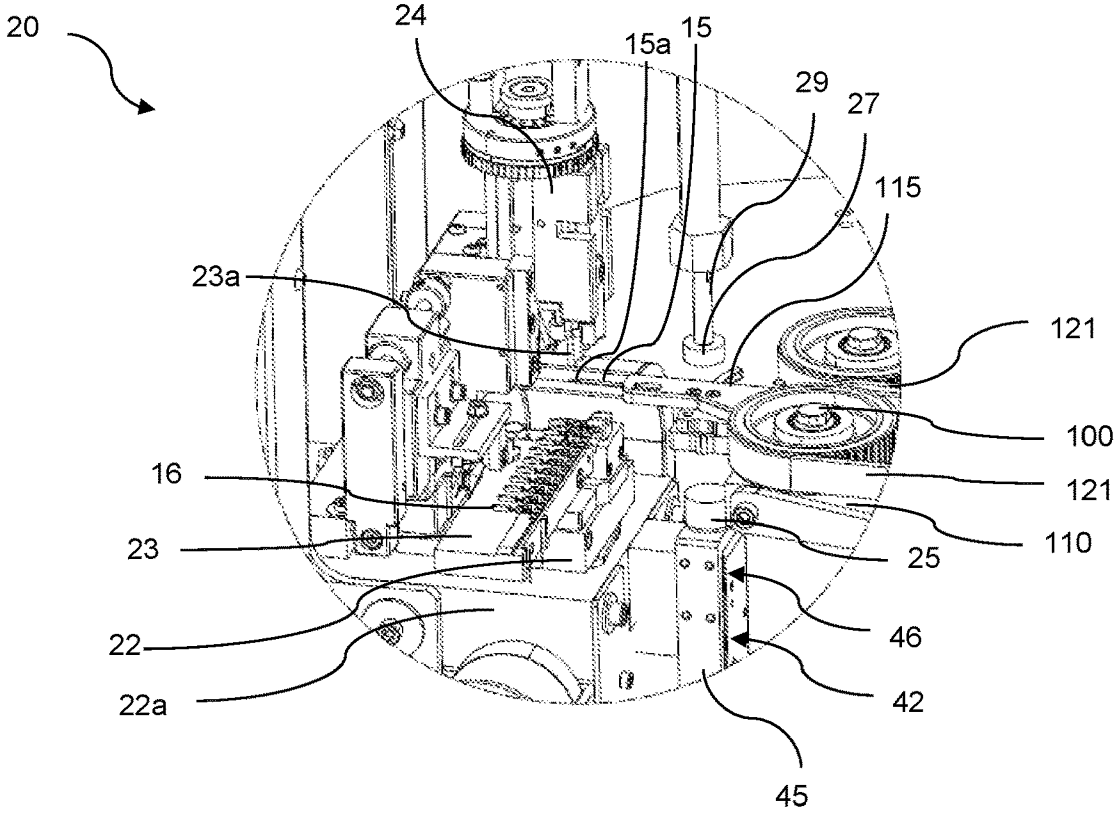
FIG. 3 shows the cable processing device according to FIG. 1 in a first detailed perspective view.

As illustrated in detail in FIG. 2 and FIG. 3, the tool mounting 22 is an anvil 22*a* of the crimping station. The anvil 22*a* has a first crimping tool 23, which is held in a stationary manner at the tool mounting 22 in the cable processing device 20 during the processing process. Several plug elements 16 are arranged on the anvil 22*a*. During the conveying, the cable 15 to be processed is typically moved along the cable conveying direction F of the cable conveying means 100. The cable to be processed is thereby guided to the tool mounting 22 or to the plug element 16, respectively, in a small guide tube 115, which, as interchangeable part, is designed exactly for the outer cable diameter. The crimping station has a second crimping tool 23*a*. The second crimping tool 23*a* is arranged on a crimping drive 24 and can be moved vertically. During the processing process, the second crimping tool 23*a* is guided in a motor-driven manner to the first crimping tool 23 or is brought into operative connection therewith, respectively, in such a way during the crimping that a crimped connection or cable connection, respectively, can be established or assembled, respectively, between one of the plug elements 16 and the cable conductor 15*a* of the cable 15. The cable conductor 15*a* of the cable 15 has to thereby be connected to the plug element 16 so as to overlap in such an exact manner that a contact-secure crimped connection is created.

The cable stop 25 described here can be positioned vertically and independently of the tool mounting 22 in a motor-driven manner in the operating location thereof and away therefrom with the help of the second positioning drive 45 of the second positioning means 40. The first cable stop 25 is guided vertically along a guide means 26. The second positioning drive 45 is formed as actuating drive and comprises a spindle as actuating unit 46 for positioning the first cable stop 25. The second positioning drive 45 is arranged in a stationary manner on the tool mounting 22 and is vertically moved with the latter. A second position sensor system 41 for detecting the vertical position of the first cable stop 25 is present, wherein the second position sensor system 41 is arranged on the second positioning drive 45. The second position sensor system 41 is a rotation sensor 42, which detects the vertical position or location, respectively, of the cable stop 25 at the cable processing device 20.

Figure 5:
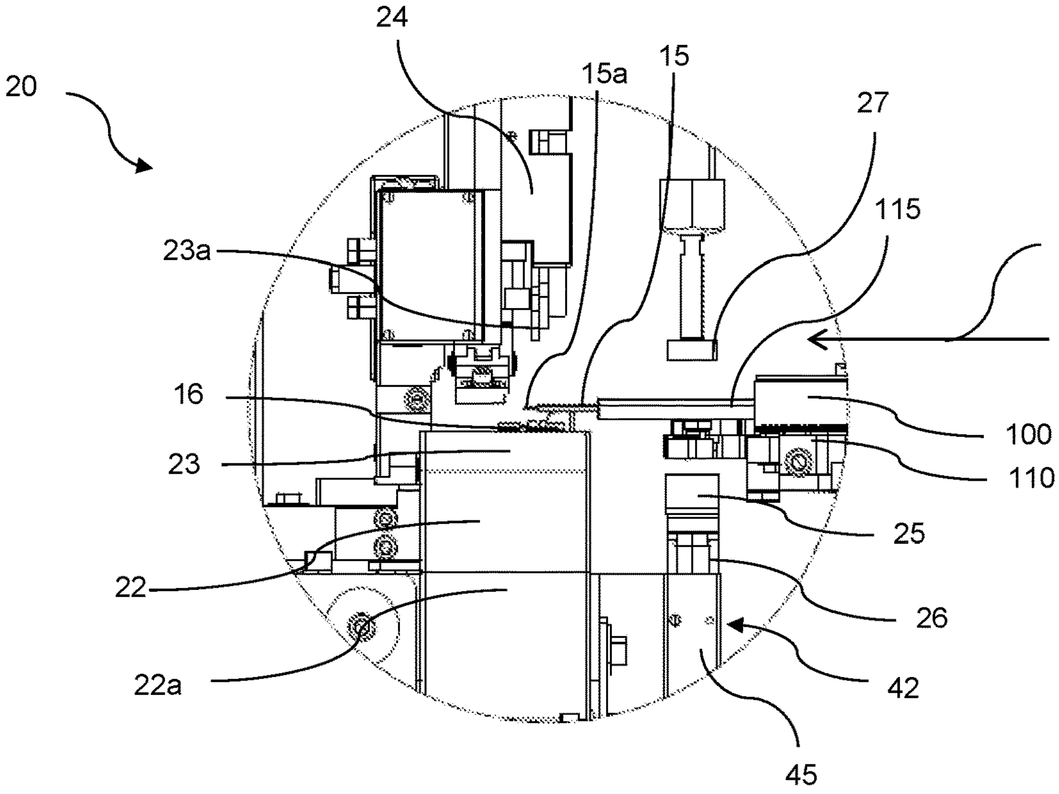
FIG. 5 shows the cable processing device according to FIG. 1 in a further detailed side view.
Figure 6:
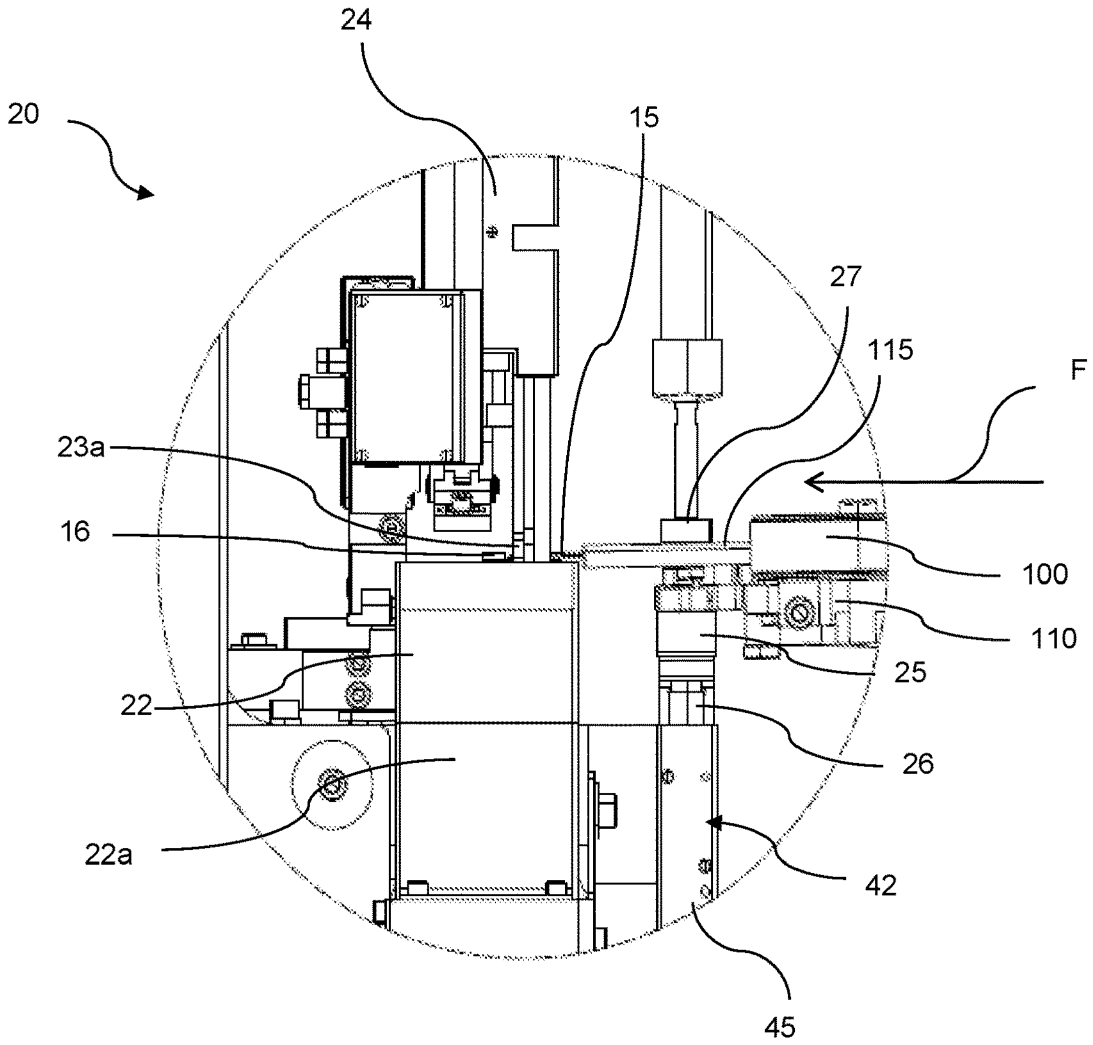
FIG. 6 shows the cable processing device according to FIG. 1 in a further detailed side view.

The first cable stop 25 is formed as counter bearing in order to fix or to support, respectively, the conveying arm 110 and thus the cable 15 and/or the small guide tube 115 in such a way that a reproducible cable processing step can be performed by means of the cable processing device 20, without the cable 15 being deformed in an unwanted manner or bending in an unwanted manner, respectively—see in particular FIG. 5 and FIG. 6.

A further cable stop 27 and a further positioning means 28 is arranged on the crimping drive 24. The further cable stop 27 is arranged opposite to the first cable stop 25 and pushes on the small guide tube 115, which, as interchangeable part, is designed so as to match the cable 15, in order to fix the cable 15 when the processing process is carried out. The further positioning means 28 has a guide rail 29 and a spring unit 29*a*, so that the further cable stop 27 is spring-mounted, so as not to damage the small guide tube 115 with the cable 15 guided therein.

The cable processing device 20 has a control means 50. The control means 50 is connected to the first positioning drive 35 for exchanging first control data, and to the second positioning drive 45 for exchanging second control data (data lines are illustrated in FIG. 1 as dashed lines). The control means 50 is electrically connected to the first position sensor system 31 and to the second position sensor system 41 in order to obtain the detected sensor data or position data, respectively, for the tool mounting 22 as well as for the first cable stop 25.

The control means 50 is designed to activate at least the second crimping tool 23*a* of the cable processing device 20 to perform a cable processing step, when reaching the operating location of the tool mounting 22 as well as when reaching the operating location of the cable stop 25. The control means 50 has a computing unit 51 for further processing the sensor data of the two position sensor systems 31 or 41, respectively. The computing unit 51 is thereby formed to create at least one control command for positioning the first tool mounting 22 from the sensor data of the first position sensor system 31. The computing unit 51 is furthermore formed to create at least one further control command for positioning the first cable stop 25 from the sensor data of the second position sensor system 41. When reaching the operating location of the first cable stop 25, thus when it is determined by means of the second position sensor system 41 that the first cable stop 25 is brought into the operating location, as well as when reaching the operating location of the tool mounting 22, thus when it is determined by means of the first position sensor system 31 that the tool mounting 22 was brought into the operating location, the pivoting of the conveying arm 110 of the cable conveying means 100 can be deactivated, and the cable processing step can be started.

The control means 50 has a storage unit 52, wherein the control means 50 is formed to recall at least one control command from the at least one storage unit 51, in order to drive at least one of the two positioning drives 35 or 45, respectively. The control command can thereby comprise position data for the operating location of the tool mounting 22 and/or of the first cable stop 25. In addition, at least one database 60 is present, which is connected to the control means 50, wherein the control means 50 is formed to recall at least one control command from the at least one database 60, in order to drive at least one of the two positioning drives 35 or 45, respectively. The database 60 is formed, for example, as decentralized cloud, so that different cable processing devices can easily recall the control commands or control data sets.

The cable processing device 20 comprises a detection means 80 for detecting cable-specific data. The detection means 80 comprises a contact-free scanner unit 81, so that the cable 15 to be processed can be recognized easily, and cable-specific data is recognized without assistance from a user. The cable-specific data comprises in particular the structural setup of the cable to be processed, such as the cable diameter, the setup or the material, respectively, of the cable conductor, the number of the individual cable conductors in the cable, the cable type, the cable conductor length, the setup and/or the material of the cable insulation or cable sheathing, respectively, etc., as listed in a non-exhaustive manner.

The scanner unit 81 furthermore detects tool-specific data relating to the crimping tools 23, 23*a*, wherein the tool-specific data comprises the setup, the dimensions, the material of the crimping tools 23, 23*a* at the cable processing device 20, not listed in an exhaustive manner.

The detection means 80 is electrically connected to the control means 50 for exchanging the cable-specific data and/or the tool-specific data. The computing unit 51 of the control means 50 is formed to convert the cable-specific data and/or tool-specific data from the detection means 80 into at least one control command for the operating location of the tool mounting 22, in order to position the tool mounting 22 according to the cable 15 to be processed. The control means 50 is furthermore formed to convert the cable-specific data and/or tool-specific data from the detection means 80 into at least one control command for the operating location of the first cable stop 25, in order to position the first cable stop 25 according to the cable 15 to be processed. The control means 50 is formed to compare the cable-specific data and/or tool-specific data detected by means of the detection means 80 to corresponding control commands in the storage unit 51 and/or in the database 60, in order to position the tool mounting 22 and/or the first cable stop 25 according to the cable 15 to be processed or to move the operating locations thereof, respectively.

The control means 50 is furthermore formed to review the compatibility of the crimping tools 23 or 23*a*, respectively, which are arranged on the cable processing device 20, with the cable 15 to be processed when detecting new cable-specific data and/or tool-specific data by means of the detection means 80, so that an incorrect processing of the cable 15 can be prevented. It is additionally reviewed whether the small guide tube 115 matches the cable diameter of the cable 15, and with which closing pressure the conveying belts 121 of the cable conveying means 100 are to enclose the cable to be conveyed. For this purpose, the computing unit 51 compares the cable-specific data and the tool-specific data from the detection means 80 as well as the cable-specific data and tool-specific data stored in the storage unit 51 or the database 60, respectively, in order to optionally trigger an alarm in the case of a discrepancy, in order to prevent the cable processing step.

A method, which can be a computer-implemented method for configuring a cable processing device 20 by means of a control means 50, will be described below on the basis of FIG. 1 to FIG. 8, wherein the method for positioning the tool mounting 22 and the first cable stop 25 is carried out automatically, wherein the tool mounting 22 and the first cable stop 25 are positioned vertically with the help of the control means 50. The positioning thereby takes place as a function of the position of a cable conveying direction F of a cable conveying means 100. The tool mounting 22 and the first cable stop 25 are positioned vertically independently of one another.

Prior to processing the cable 15, the tool mounting 22 and the first cable stop 25 are in a position, which is spaced apart from the operating location thereof in such a way that the conveying arm 110 of the cable conveying means 100 can pivot in an unhindered manner to the cable processing device 20 in the cable pivoting plane—see FIG. 2 or FIG. 3, respectively. The cable pivoting plane is that plane, which is aligned parallel to the cable conveying direction F when conveying the cable 15.

The control means 50 is already configured beforehand in such a way that the cable type of the cable 15 to be processed as well as the crimping tools 23 and 23*a*, which are arranged in the crimping station, are known. The control means 50 thus recalls the control commands from the storage unit 52 or the database 60, so that the computing unit 51 of the control means 50 is already aware of the respective control commands relating to the operating location of the tool mounting 22 and of the first cable stop 25.

Sensor data is detected by the first position sensor system 31 and the second position sensor system 41 and is transmitted to the control means 50 in a first step, so that the control means 50 can determine the current position of the tool mounting 22 as well as the current position of the first cable stop 25 with the help of the sensor data.

Figure 4:
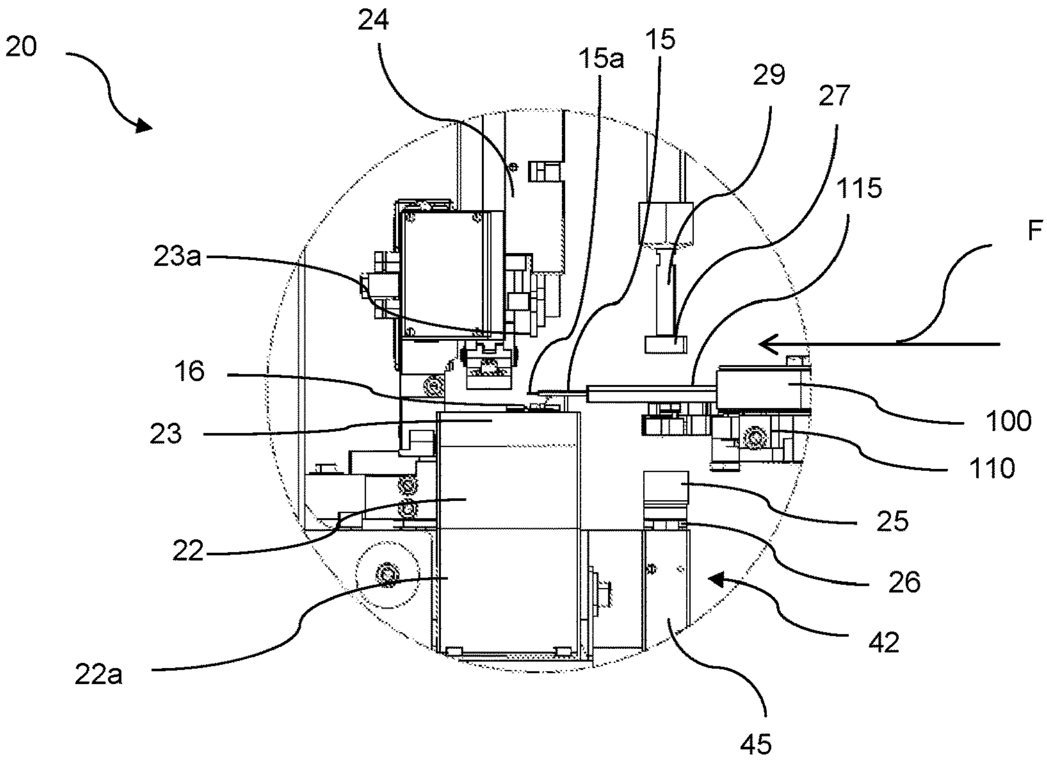
FIG. 4 shows the cable processing device according to FIG. 1 in a further detailed side view.

In a further step, the first positioning drive 35 receives the matching control command from the control means 50, so that the tool mounting 22 is positioned in the operating location thereof—see FIG. 4. The plug element 16 arranged on the tool mounting 22 is positioned exactly below the cable conductor 15*a* of the cable 15, wherein the cable 15 is optionally adjusted along the cable conveying direction F with the help of the conveying drive 120. The positioning of the tool mounting 22 in the operating location thereof takes place on the basis of the cable-specific data and tool-specific data.

In a further step, the second positioning drive 45 receives the matching control command from the control means 50, so that the first cable stop 25 is positioned in the operating location thereof—see FIG. 5. The first cable stop 25 is thereby brought close to the small guide tube 115 or the conveying arm 110, respectively, and is positioned adjacent thereto.

The positioning of the first cable stop 25 in the operating location thereof takes place on the basis of the cable-specific data and tool-specific data. The vertical distance between the cable 15 and the plug element 16 is thereby approximately identical to the vertical distance between the first cable stop 25 and the conveying arm 110.

Figure 7:
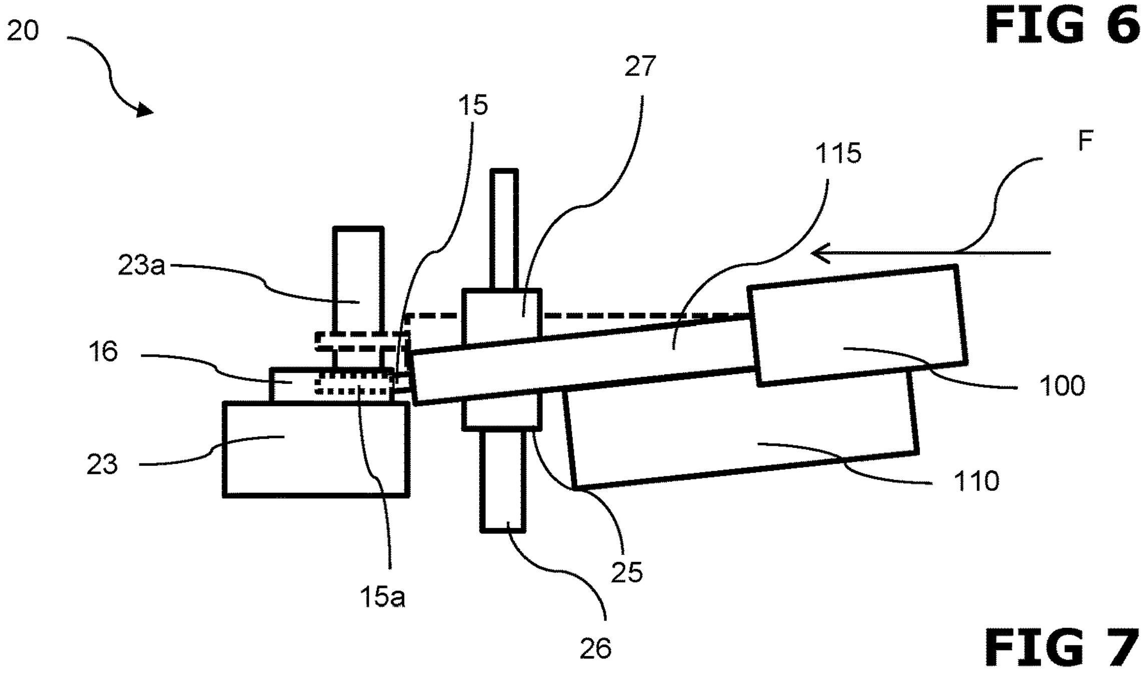
FIG. 7 shows the detailed side view of the cable processing device according to FIG. 6 in a simplified side view as schematic diagram.

The actual cable processing step takes place subsequently, wherein the second crimping tool 23*a* is moved vertically towards the first crimping tool 23 with the help of the crimping drive 24. The further cable stop 27 arranged on the crimping drive 24 is thereby moved vertically and pushes on the small guide tube 115, in order push and to fix the cable 15 guided therein in the direction of the first cable stop 25, when the processing process is carried out. To prevent an overshooting of the small guide tube 115, which carries mass, the first cable stop 25 serves as counter bearing, so that a bending of the cable 15 or of the cable conductor 15*a*, respectively, at the cable 15 is prevented—see FIGS. 6 and 7. The cable 15 is pushed into the corresponding crimped connection section on the plug element 16 at the same time, and the positive connection is established. As shown in detail in FIG. 7, the small guide tube 115, together with the cable conveying means 100 and the conveying arm 110, is bent by means of the further cable stop 27 out of the horizontal cable pivoting plane by a few tenth of angular degrees (0.1° to max. 1°) when moving the first crimping tool 23*a* to the second crimping tool 23. The stripped front conductor end of the cable conductor 15*a* of the cable 15 is thereby placed exactly into the second crimping tool 23. The small guide tube 115 is an interchangeable part and its inner bore is designed exactly to the outer diameter of the conductor/cable 15 to be processed. The cable 15 is thus held all around by this small guide tube 115 in such a way that it cannot bend radially. In the axial direction, the cable 15 is positioned and held exactly by means of the cable conveying means 100, in which the cable 15 is clamped between the conveying belts 121 (see FIG. 3). The bending angle of the small guide tube 115, together with the cable conveying means 100 and the conveying arm 110 through the further cable stop 27 out of the horizontal cable pivoting plane is a few angular degrees. FIG. 7 shows a schematic diagram, in which the bending angle is illustrated significantly larger. As a result, a cable end product or a cable intermediate product, respectively, with high quality are produced.

Figure 8:
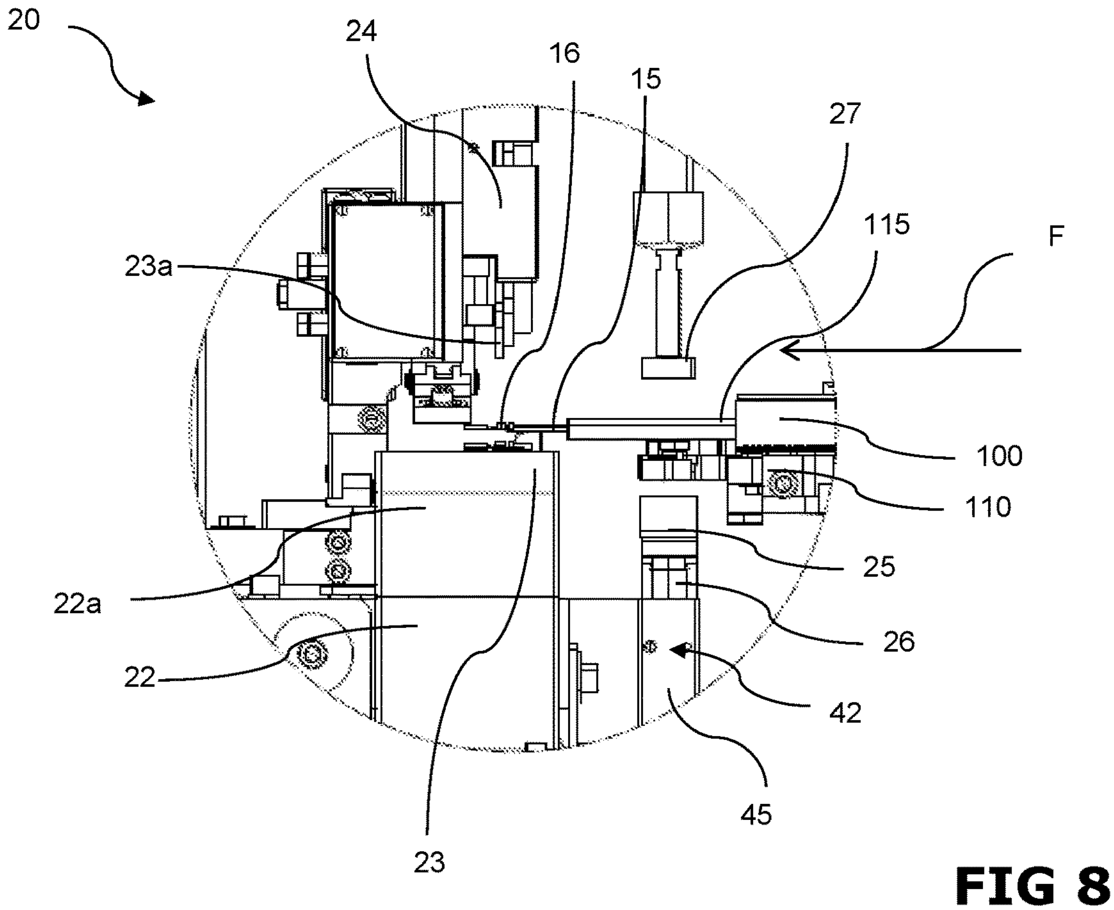
FIG. 8 shows the cable processing device according to FIG. 1 in a further detailed side view.

The second crimping tool 23*a* as well as the further cable stop 27 is subsequently moved vertically into the initial location thereof with the help of the crimping drive 24, so that the cable 15 is aligned parallel to the cable pivoting plane of the cable conveying means 100 again—see FIG. 8.

In an alternative method for the above-disclosed method for configuring a cable processing device 20, the above-mentioned method steps are performed, wherein the control means 50 is now not configured beforehand. The cable type of the cable 15 to be processed as well as the crimping tools 23 and 23*a* arranged in the crimping station are not known and are recognized by the scanner unit 81 of the detection means 80. The scanner unit 81 scans, for example, a QR code, which is arranged on the cable 15, and thus recognizes the cable-specific data of the cable 15. The scanner unit 81 furthermore scans, for example, a barcode, which is arranged on the crimping tool 23*a*, and thus recognizes the tool-specific data of the crimping tool 23*a*.

The cable-specific data and/or tool-specific data is transmitted from the detection means 80 to the control means 50 (data lines are illustrated as dashed lines). The control means 50 converts the cable-specific data and/or tool-specific data from the detection means 80 into at least one control command for the operating location of the tool mounting 22, so that the tool mounting 22 is positioned according to the cable 15 to be processed. The control means 50 furthermore converts the cable-specific data and/or tool-specific data from the detection means 80 into at least one control command for the operating location of the first cable stop 25, so that the first cable stop is positioned according to the cable 15 to be processed.

Figure 9:
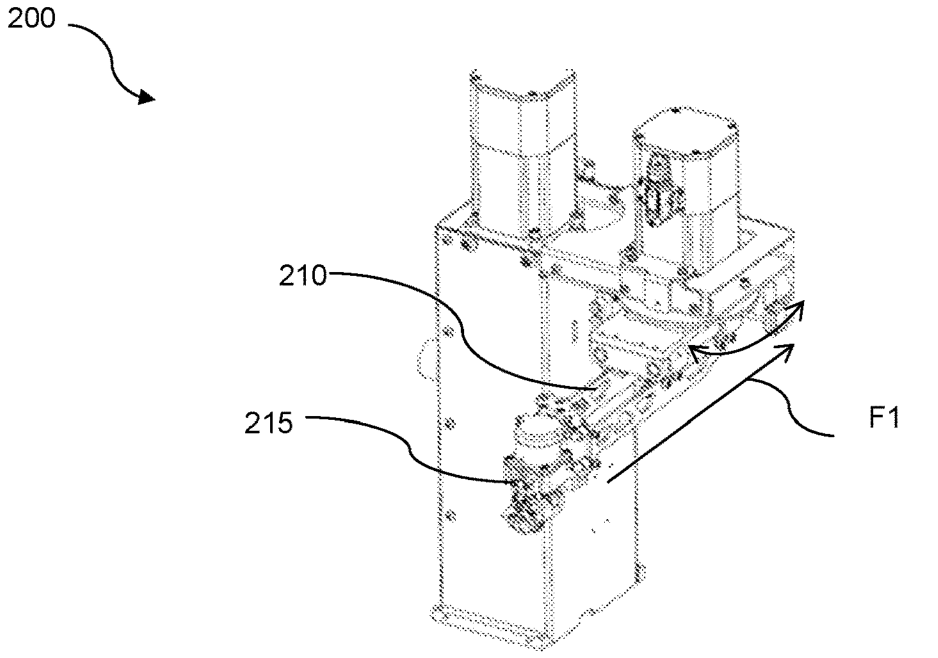
FIG. 9 shows a further embodiment of a cable conveying means for a cable processing device according to FIG. 1 in a perspective illustration.

FIG. 9 shows a further cable conveying means 200 with a cable conveying direction F1. The cable conveying means 200 has a conveying arm 210, which can be pivoted in a cable pivoting plane, comprising a gripper means 215 for gripping the cable 15, so that the cable 15 can be pivoted horizontally in the cable pivoting plane to a cable processing device 20 as described here. The cable conveying direction F1 is typically located at the same horizontal height as the cable conveying direction F of the cable conveying means 100. During the cable processing step, the second cable stop 27 pushes on the gripper means 215 in order to push the cable 15 guided therein vertically in the direction of the first cable stop 25 and to fix it. This cable conveying means 200 is used, for example for processing the trailing end of the cable 15.

Figure 10:
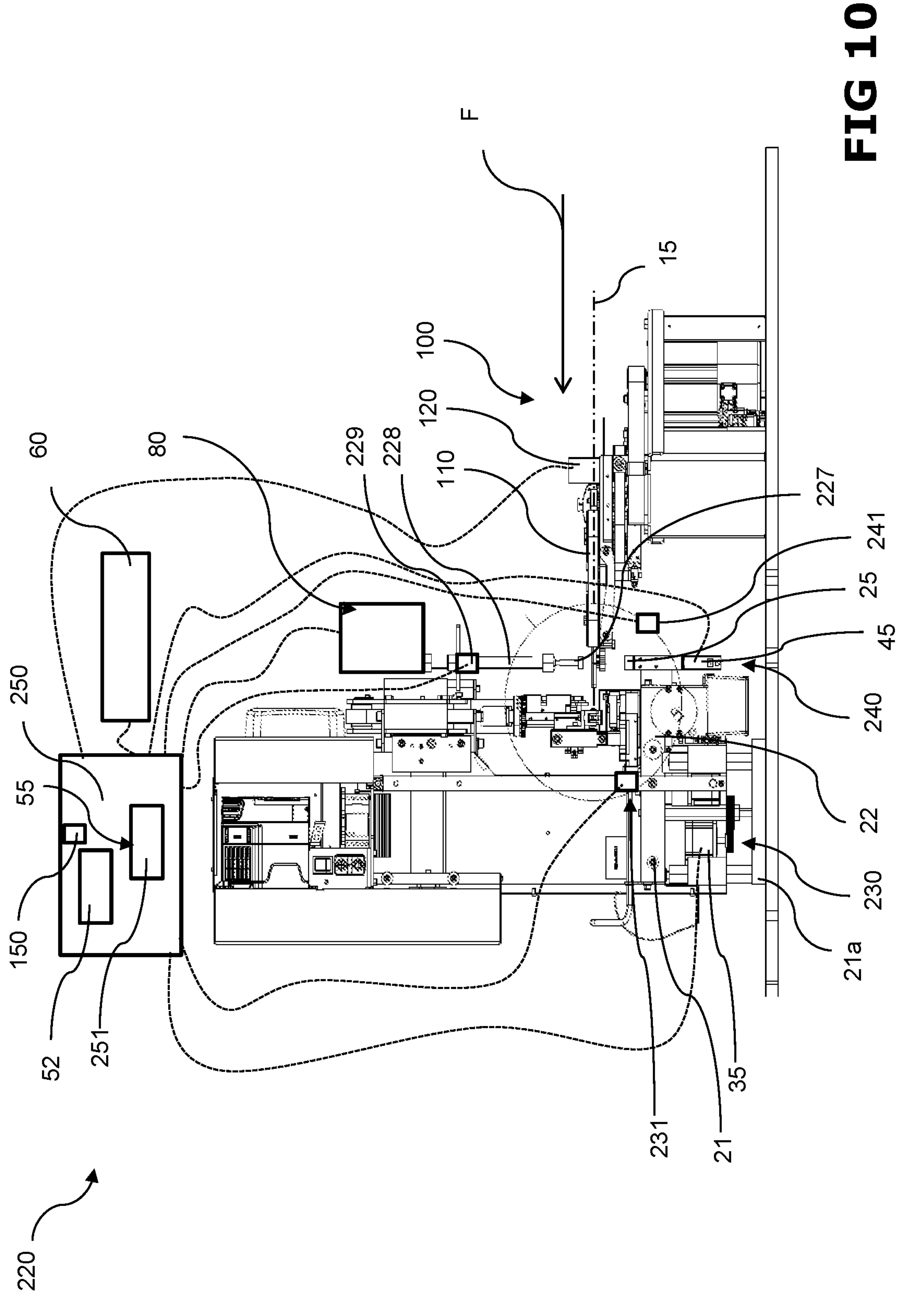
FIG. 10 shows a further embodiment of a cable processing device according to the invention in a further side view.

FIG. 10 shows a further embodiment of the crimping station for assembling a cable connection at a cable end of the cable 15 as cable processing device 220 for processing a cable 15. This cable processing device 220 has essentially the same functional and structural features of the cable processing device 20, as described in FIG. 1 to FIG. 8.

As first and second position sensor system, the cable processing device 220 in each case has a position sensor 231 or 241, respectively. The first position sensor 231 is arranged in the region of the tool mounting 22. The first position sensor 231 is arranged spaced apart from and adjacent to the first positioning means 230 of the tool mounting 22, and can be, for example, an optical sensor, such as, for example, a laser barrier or the like. The first position sensor 231 is electrically connected to the control means 250 for transferring sensor data.

The second position sensor 241 is arranged in the region of the first cable stop 25. The second position sensor 241 is arranged spaced apart from and adjacent to the second positioning means 240 of the first cable stop 25, and can be, for example, an optical sensor. The second position sensor 241 is electrically connected to the control means 250 for transferring sensor data.

The positioning means 230 or 240, respectively, are servomotors and are connected to the control means 250 for exchanging control commands.

The computing unit 251 of the control means 250 is formed to create at least one control command for positioning the first tool mounting 22 from the sensor data of the first position sensor 231. The computing unit 251 of the control means 250 is furthermore formed to create at least one control command for positioning the first cable stop 25 from the sensor data of the second position sensor 241.

The further cable stop 227 has a further positioning means 228, wherein the further positioning means 228 in particular has a further positioning drive 229 for at least vertically positioning the further cable stop 227. The further cable stop 227 is arranged opposite to the first cable stop 25 and, as described above, pushed on the small guide tube 115 in order to fix the cable 15 guided therein, when the processing process is carried out. The further positioning drive 229 is connected to the control means 250 for exchanging the position data of the operating location of the further cable stop 227.

The methods described above with the help of FIG. 2 to FIG. 8 can also be carried out by means of the cable processing device 220.

Figure 11:
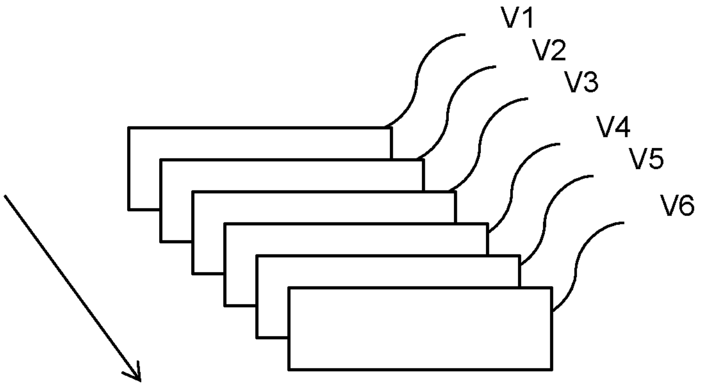
FIG. 11 shows a method according to the invention in a flow chart.

FIG. 11 shows a flow chart and illustrates a computer-implemented method for automatically determining and creating control commands and/or control data for controlling the cable processing device 20 or the cable processing device 220 by means of a control means 50 or 250, respectively, which carries out a method for positioning a tool mounting 22 and a first cable stop 25, wherein a control data set and/or a control command is created and stored.

The cable-specific data and/or tool-specific data is detected by the detection means 80 and is transmitted to the control means 50, as described above (step V1). The control means 50 converts the cable-specific data and/or tool-specific data from the detection means 80 into at least one control command for the operating location of the tool mounting 22 (step V2), so that the tool mounting 22 is positioned according to the cable to be processed (step V3). The control means 50 furthermore converts the cable-specific data and/or tool-specific data from the detection means 80 into at least one control command for the operating location of the first cable stop 25 (step V4), so that the first cable stop 25 is positioned according to the cable 15 to be processed (step V5).

The control data sets and/or control commands created thereby are stored in the storage unit 51 of the control means 50 and/or database 60 (step V6). The database is formed, for example, as decentralized cloud and is interconnected with control means of different cable processing devices 20 or 220, respectively, in order to exchange the created control data and/or control commands.

A computer program product 55 is furthermore present in the control means 50, which comprises control commands and/or control data, which, when running the program by means of a computing unit 51, prompt the latter to carry out the method/the steps of the method for configuring a cable processing device 20 or the cable processing device 220, respectively, or the method for automatically determining and creating control commands and/or control data.

A computer readable storage medium 150 is furthermore present, which comprises several control commands and/or control data, which, when run by the computing unit 51, prompt a control means 50 to carry out the method or the steps, respectively, of the above-mentioned method for configuring a cable processing device 20 or cable processing device 220.

LIST OF REFERENCE NUMERALS

| | | | |
|---|---|---|---|
| 15 | cable | 15a | cable conductor |
| 16 | plug element | | |
| 20 | cable processing device | 21 | basic support structure |
| 21a | base structure | 22 | tool mounting |
| 22a | anvil | 23 | first crimping tool |
| 23a | second crimping tool | 24 | crimping drive |
| 25 | first cable stop | 26 | guide means |
| 27 | further cable stop | 28 | positioning means of 27 |
| 29 | guide rail | 29a | spring unit |
| 30 | first positioning means | 31 | first position sensor system |
| 32 | rotation sensor | | |
| 35 | first positioning drive | 36 | actuating unit |
| 40 | second positioning means | 41 | second position sensor system |
| 42 | rotation sensor | | |
| 45 | second positioning drive | 46 | actuating unit |
| 50 | control means | 51 | computing unit |
| 52 | storage unit | | |
| 55 | computer program product | 60 | Database |
| 80 | detection means | 81 | scanner unit |
| 100 | cable conveying means | 110 | conveying arm |
| 115 | small guide tube | 120 | conveying drive |
| 150 | computer readable storage medium | | |
| 200 | cable conveying means | 210 | conveying arm |
| 215 | gripper means | | |
| 220 | cable processing device | | |
| 227 | further cable stop | 228 | further positioning means |
| 229 | further positioning drive | | |
| 230 | first positioning means | 231 | first position sensor |
| 240 | second positioning means | 241 | second position sensor |
| 250 | control means | 251 | computing unit |
| F | cable conveying direction | V1-V6 | method steps |
| F1 | cable conveying direction | | |

The invention claimed is:

1. A cable processing device for crimping a cable connection to a cable end of a cable, comprising:

a tool mounting arranged to hold the cable connection, a first positioning means includes a first positioning drive for vertically positioning the tool mounting relative to a cable conveying direction of a cable conveying means, a first cable stop arranged to support the cable during crimping of the cable connection to the cable, a second positioning means comprising a second positioning drive for at least vertically positioning the first cable stop relative to the cable conveying direction, and a control means, connected to the first positioning drive for exchanging first control data, and to the second positioning drive is connected to the control means for exchanging second control data to independently position the tool mounting and the cable stop.

2. The cable processing device according to claim 1, wherein the second positioning drive is connected to the control means for at least vertically positioning the first cable stop.

3. The cable processing device according to claim 1, comprising a first position sensor system for detecting at least the vertical position of the tool mounting, and at least one of:

the first position sensor system is arranged on the first positioning drive, or the first position sensor system comprises a first position sensor.

4. The cable processing device according to claim 1, comprising a second position sensor system for detecting at least the vertical position of the first cable stop, and at least one of:

the second position sensor system is arranged on the second positioning drive, or the second position sensor system comprises a second position sensor.

5. The cable processing device according to claim 1, wherein the control means has a computing unit, and at least one of:

the control means is connected to the first position sensor system, or the control means is connected to the second position sensor system for exchanging sensor data.

6. The cable processing device according to claim 5, wherein the computing unit is arranged to create at least one control command for positioning the first tool mounting from the sensor data of the first position sensor system, or to create at least one further control command for positioning the first cable stop from the sensor data of the second position sensor system.

7. The cable processing device according to claim 1, further comprising a storage unit connected to the control means, and the control means is arranged to recall at least one control command from the storage unit, in order to drive at least one of the two positioning drives.

8. The cable processing device according to claim 1, further comprising a base structure, wherein the tool mounting is arranged in a stationary manner on the base structure, and the base structure is positionable at least vertically relative to the cable conveying direction of the cable conveying means with the help of the first positioning means.

9. The cable processing device according to claim 1, comprising a further cable stop and a further positioning means, the further positioning means has a further positioning drive for at least vertically positioning the further cable stop.

10. The cable processing device according to claim 1, further comprising a detection means, for detecting at least one of cable-specific data or cable connection-specific data.

11. The cable processing device according to claim 10, wherein the detection means is connected to the control means for exchanging at least one of the cable-specific data or cable connection-specific data.

* * * * *